(12) United States Patent
Farley et al.

(10) Patent No.: US 6,590,524 B1
(45) Date of Patent: Jul. 8, 2003

(54) METHOD AND MEANS FOR PRECISE TIME SYNCHRONIZATION

(75) Inventors: Michael G. Farley, Cedar Rapids, IA (US); Jeffrey J. Jorgensen, Cedar Rapids, IA (US); Jeffrey L. Tuohino, Cedar Rapids, IA (US); Susan R. Schellenberg, Cedar Rapids, IA (US); Wilmer A. Mickelson, Cedar Rapids, IA (US); Mitchell A. Corcoran, Mt. Vernon, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 09/568,104

(22) Filed: May 10, 2000

(51) Int. Cl.⁷ ............................. G01S 5/02; H04B 7/185
(52) U.S. Cl. ............................ 342/357.06; 342/357.14; 701/213
(58) Field of Search ................. 342/357.06, 357.14; 701/213

(56) References Cited

U.S. PATENT DOCUMENTS

| | | | |
|---|---|---|---|
| 5,361,398 A | * 11/1994 | Christian et al. | 455/51.2 |
| 5,717,404 A | * 2/1998 | Malla | 342/352 |
| 5,886,665 A | 3/1999 | Dosh et al. | 342/357 |
| 5,886,666 A | 3/1999 | Schellenberg et al. | 342/357 |
| 6,002,709 A | * 12/1999 | Hendrickson | 375/206 |
| 6,104,729 A | * 8/2000 | Hellum et al. | 370/503 |
| 6,236,623 B1 | * 5/2001 | Read et al. | 368/46 |

* cited by examiner

Primary Examiner—Theodore M. Blum
(74) Attorney, Agent, or Firm—Nathan O. Jensen; Kyle Eppele

(57) ABSTRACT

Disclosed is a method which synchronizes a slave time with a master time. The master time is derived from a received signal. The master time is compared to the slave time to detect any offset of the slave time relative to the master time. If an offset is detected, the slave time is adjusted to correct the offset. Also disclosed is a method of synchronizing a pseudolite transmitter time with GNSS time. The transmitter time is compared to GNSS time to detect any offset of the transmitter time. The transmitter time is adjusted to correct the offset if an offset is detected. Also disclosed is an improved pseudolite. The pseudolite has a pseudolite transmitter and GNSS receiver. The pseudolite transmitter time is synchronized with GNSS time.

21 Claims, 5 Drawing Sheets

US 6,590,524 B1

METHOD AND MEANS FOR PRECISE TIME SYNCHRONIZATION

BACKGROUND OF THE INVENTION

A. Field of the Invention

The present invention relates to a method and apparatus to synchronize two or more clocks. More specifically, the present invention relates to a method of controlling a slave time by adjusting the slave time based on a master time. In one embodiment, a global positioning system (GPS) receiver calculates GPS time and sends a correction signal to a pseudo-satellite, or pseudolite (PL), in order to slave the PL time to GPS time.

B. Problems in the Art

The use of GPS signals to calculate position and GPS time is known in the art. There are times when it is difficult or impossible to receive the true GPS signals from the satellites. For example, there are times when the GPS signals are jammed in a localized area, or a GPS receiver may be located in a valley where it cannot receive signals from a sufficient number of satellites.

In order to make GPS signals available to receivers in locations where the true signal is being jammed, the concept of pseudolites was invented. A PL includes a PL transmitter that sends out pseudolite signals which are designed to simulate the true GPS signals from the satellites. An example of a ground-based PL is disclosed in U.S. Pat. No. 5,886,665. An example of an airborne pseudolite is disclosed in U.S. Pat. No. 5,886,666. The disclosures of U.S. Pat. Nos. 5,886,665 and 5,886,666 are hereby incorporated by reference in their entirety. A PL allows for reception of GPS signals in those locations where the true GPS signals are being jammed.

In order for a receiver to accurately determine a position solution from the PL signals, it is important that the PL signals precisely mimic the true GPS signals. In order for PL signals to accurately match true GPS signals, it is important that the PL time match GPS time. Relatively small time errors between the PL time and GPS time can introduce significant errors along the line of sight of the PL, thereby limiting navigational accuracy. In order to approximate GPS time, a PL could be provided with a high accuracy, costly clock, such as the clocks on the GPS satellites. Once the high accuracy clock was set to GPS time, variances from GPS time would not be as great. However, the high accuracy clock would still require a time synch to simulate GPS time. There is a need in the art for a method that provides precise time synchronization between GPS time and pseudolite time, which does not require the expense of a high accuracy clock.

Therefore, it is a primary object of the present invention to provide a method of time synchronization which solves problems and deficiencies in the art.

It is a further object of the present invention to provide a method which synchronizes pseudolite time with GPS time.

It is a further object of the present invention to make position solutions obtained from pseudolite signals more accurate.

It is a further object of the present invention to correct for environmental effects which limit the accuracy of a pseudolite clock.

It is a further object of the present invention to allow for the use of a less expensive, less accurate pseudolite clock, while still maintaining accurate time within the pseudolite.

These, as well as other objects and features of the present invention, will be apparent from the following detailed description and claims in conjunction with the accompanying drawings.

SUMMARY OF THE INVENTION

The present invention includes a method of synchronizing a slave time with a master time. The first step in the method is receiving a signal from a remote source from which the master time can be derived. After the signal is received, the slave time is compared to a master time to detect any offset of the slave time relative to the master time. If there is any offset, the slave time is adjusted to correct the offset.

The present invention can also include a method of synchronizing a time of a pseudolite transmitter with a time of a global navigational satellite system. The first step is initializing the pseudolite transmitter time. After the pseudolite transmitter time has been initialized, the time of the pseudolite transmitter is compared to global navigation satellite system (GNSS) time to determine any offset of the pseudolite transmitter time relative to GNSS time. If there is any offset, the pseudolite transmitter time is adjusted to correct the offset.

The present invention can also include an improved pseudolite. The improved pseudolite includes a global navigational satellite system (GNSS) receiver and a pseudolite signal transmitter. The receiver is in operative communication with the transmitter. The receiver is capable of receiving a signal from the transmitter from which the transmitter time can be derived. The receiver is programmed to compare the pseudolite time to a GNSS time to detect any offset of the pseudolite time relative to GNSS time, and to communicate a control signal to the transmitter to adjust the pseudolite time to correct the offset if an offset is detected.

DETAILED DESCRIPTION OF AN EXEMPLARY EMBODIMENT

The present invention will be discussed with respect to the global positioning system (GPS). However, it will be apparent to those skilled in the art that the present invention can be applied to any global navigational satellite system (GNSS), including the Russian global orbiting navigational satellite system (GLONASS). The present invention is not intended to be limited to GPS applications. It is also intended that the present invention apply to time synchronization in areas unrelated to GNSS applications.

Figure 1:
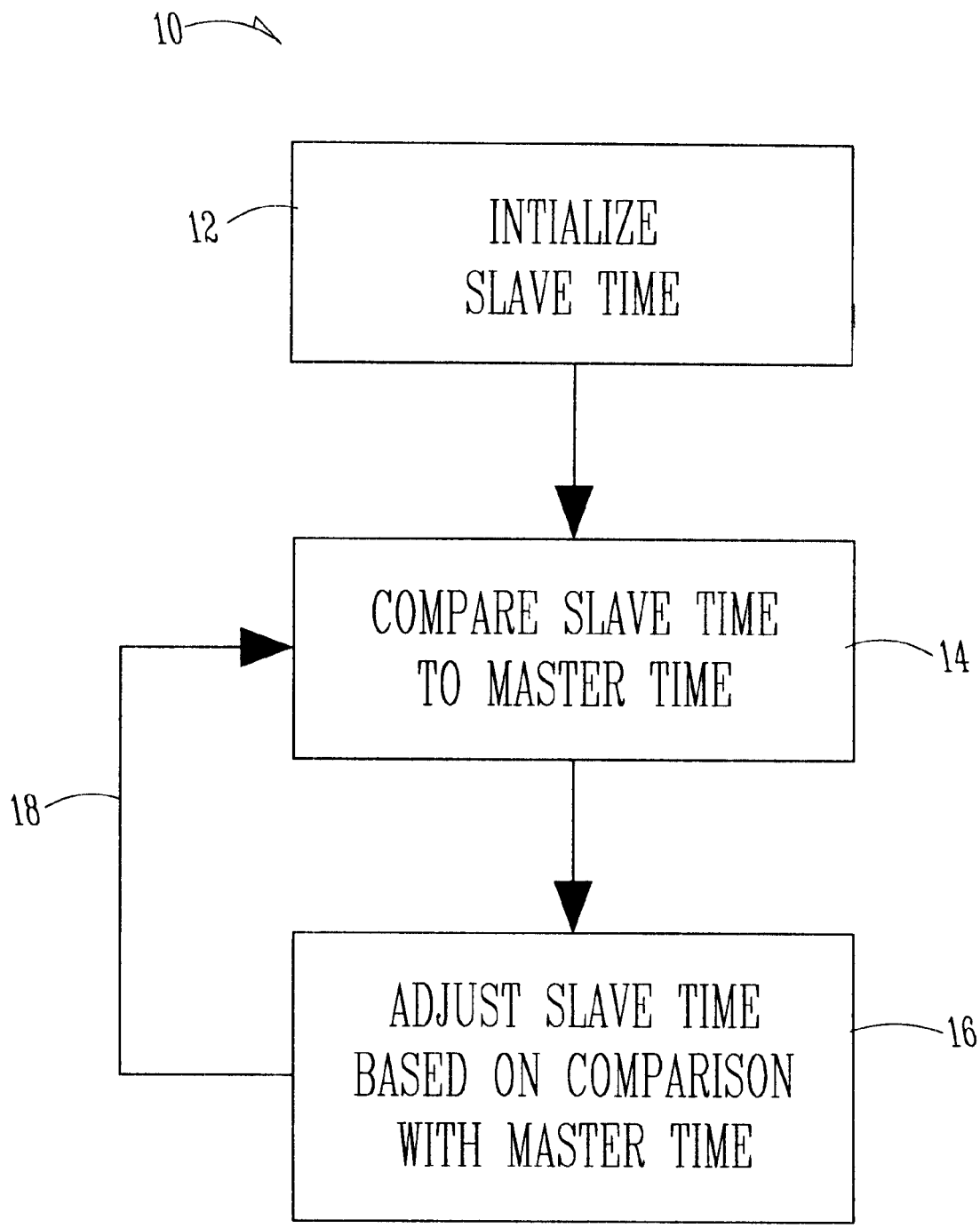
FIG. 1 is a flowchart which illustrates an embodiment of a method of time synchronization according to the present invention.

FIG. 1 shows a block diagram of a method of time synchronization 10 according to an embodiment of the present invention. The method 10 may include the initial step of initializing a slave time 12. The slave time could be a pseudolite time. After initializing the slave time 12, the next step is comparing the slave time with the master time 14 to detect any offset of the slave time relative to the master time. The master time could be GPS time. The final step is adjusting the slave time 16 to correct the offset. The steps of comparing the slave time with the master time, and adjusting the slave time to correct the error, are recursively repeated in a closed-loop 18 manner. This method allows the slave time to be closely synchronized with the master time.

Figure 2:
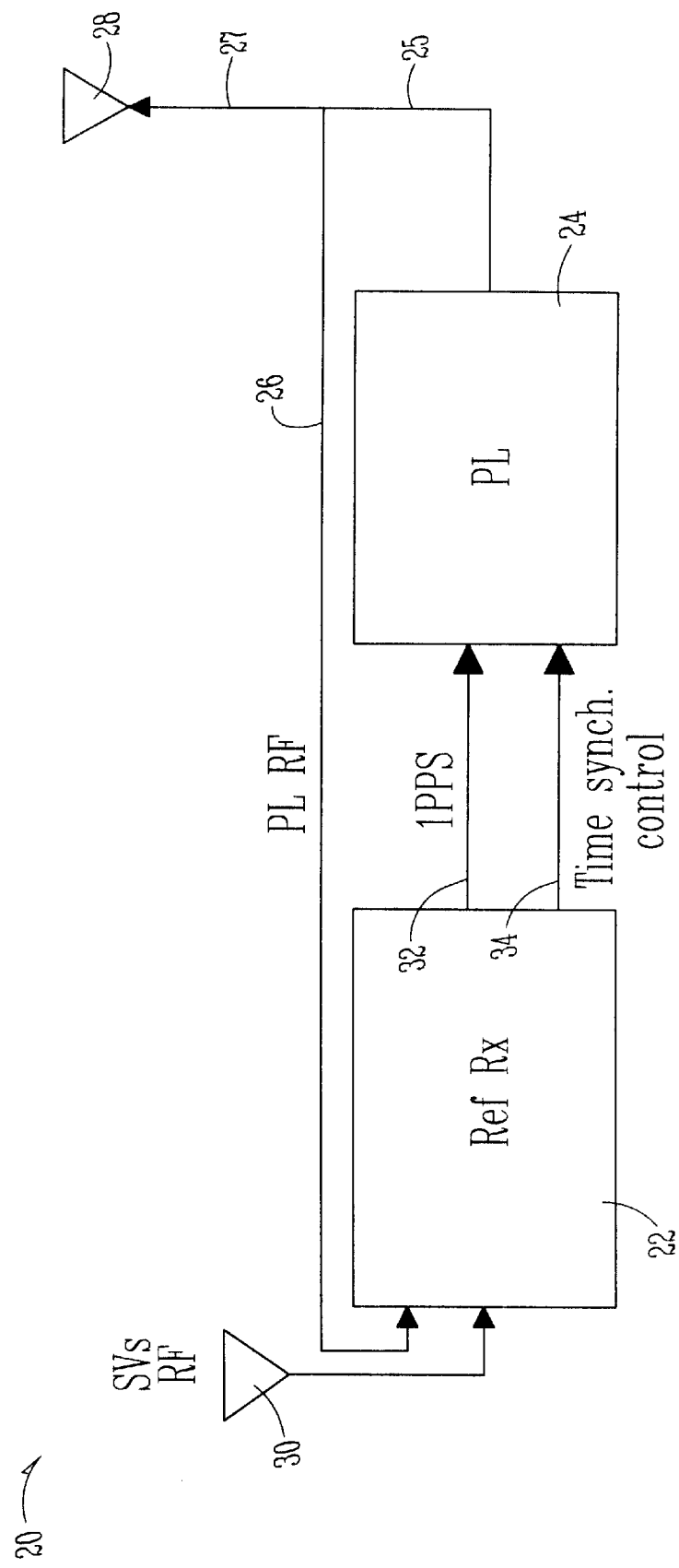
FIG. 2 is a block diagram which shows a pseudolite that utilizes the method of FIG. 1.

FIG. 2 shows a block diagram of an improved pseudolite (PL) 20. PL 20 includes a reference receiver 22. Reference receiver 22 could be, for example, a GNP-10, or a PLG2, both of which are available from Rockwell Collins of Cedar Rapids, Iowa, a division of Rockwell International Corporation, having a corporate headquarters in Milwaukee, Wis. Other reference receivers could be used.

PL 20 also includes a PL transmitter 24. PL transmitter 24 outputs pseudolite signals 27 (also referred to as pseudo GNSS or pseudo GPS signals) through antenna 28. An example of PL transmitter 24 is a personal computer which has a personal computer signal generator (PCSG) card installed in the computer. A PCSG card is available from Rockwell Collins.

PL transmitter 24 is cabled to reference receiver 22. Pseudolite signal 26 is input into reference receiver 22 through a cable connection. Pseudolite signal 26 could be communicated to reference receiver 22 in other manners. Reference receiver 22 also receives true GPS signals (labeled SVs RF in FIG. 1) through its antenna 30. Reference receiver 22 calculates GPS time from the true GPS signals through methods that are known in the art. Reference receiver 22 also calculates the PL transmitter 24 time from pseudolite signal 26. The PL transmitter 24 time is determined from pseudorange measurements by comparing pseudolite signal 26 with the reference receiver's 22 locally generated pseudo random noise (PRN) code. The PL transmitter 24 time error is then calculated based on the equation:

$$PL\ time\ error = measured\ pseudolite\ pseudorange - (reference\ receiver\ clock\ bias + reference\ receiver\ hardware\ delay + PL\ cable\ delay). \quad (1)$$

The reference receiver 22 clock bias is determined from the true GPS signals through methods that are known in the art, such as through satellite pseudorange measurements. The reference receiver 22 hardware delay and the PL cable delay will vary, based on the type of reference receiver 22, the length and type of cable, and other factors. These delays are generally constant and are known in advance, and they are stored in the pseudolite. Based on the calculated PL transmitter 24 time error, reference receiver 22 transmits a time synch control signal 34 to the PL transmitter 24. The PL transmitter 24 time is then adjusted based on the time synch control signal 34. Of course, rather than determining PL transmitter 24 time from PL pseudorange measurements, the transmitter 24 time could be directly input into reference receiver 22.

Figure 3:
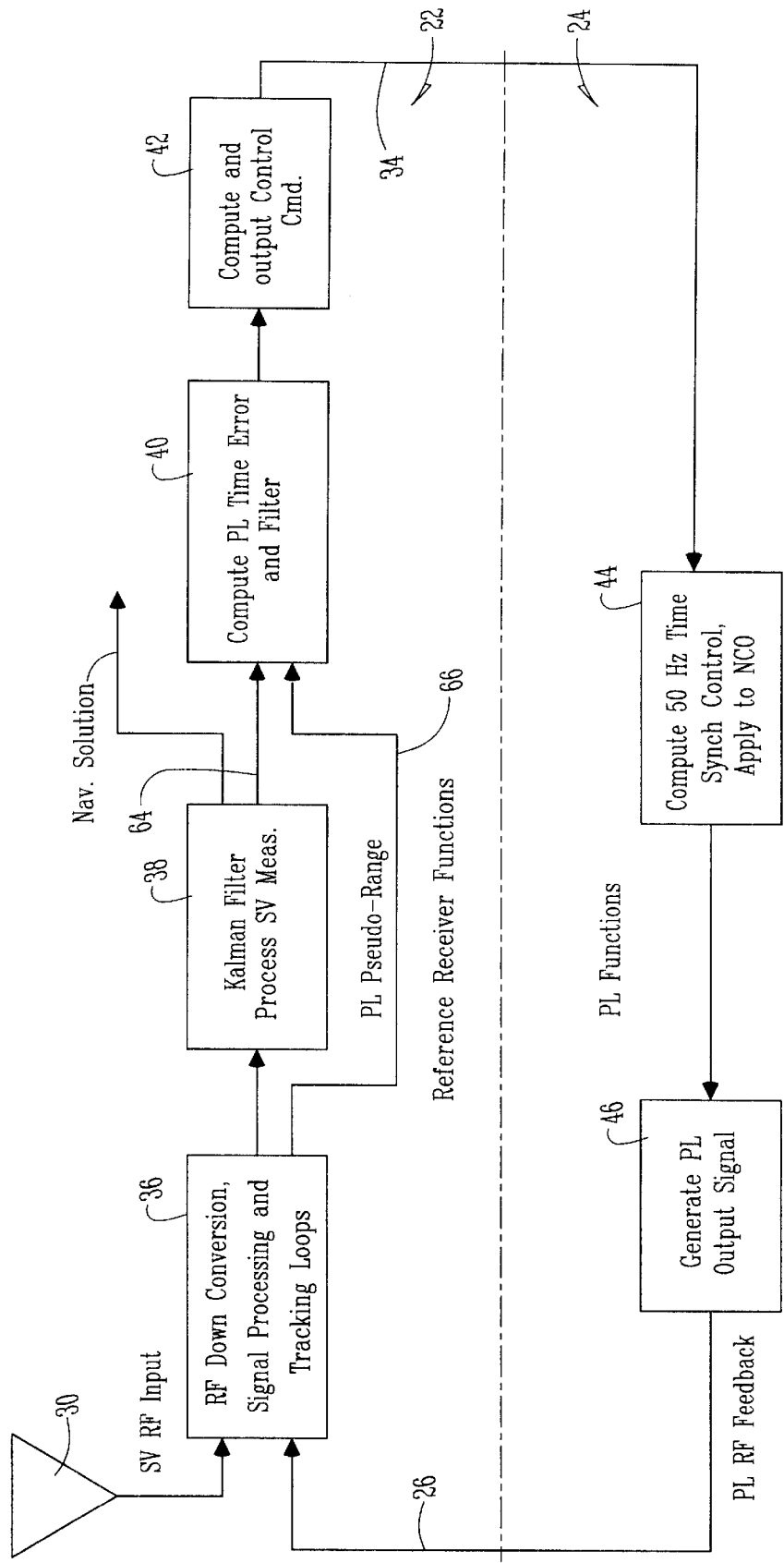
FIG. 3 is a block diagram which illustrates in greater detail the block diagram of FIG. 2.

FIG. 3 shows a block diagram which illustrates PL 20 in greater detail. Reference receiver 22 receives the SV (space vehicle) signals in antenna 30. Reference receiver 22 performs RF conversion, signal processing, and tracking loops 36 through conventional methods. The Kalman filter 38 calculates the navigational solution from the SV signals. The Kalman filter 38 also calculates the reference receiver 22 clock bias.

Reference receiver 22 also receives the pseudolite signal 26. Reference receiver 22 calculates the PL pseudorange 66 to determine the PL transmitter 24 time. To improve PL pseudorange calculations, the pseudorange measurement can be carrier smoothed using information from the carrier tracking loops. Reference receiver 22 computes the PL transmitter 24 time error by comparing PL transmitter 24 time to GPS time through the use of equation (1). In some receivers, the GPS time calculation may be noisy, causing the measured PL transmitter 24 time error to also be noisy. To improve synchronization, reference receiver 22 may lowpass filter the time error before computing a control signal to send to the PL transmitter 24.

Reference receiver 22 computes and outputs 42 a digital control command 34. The digital control command 34 is sent once a second to PL transmitter 24. The digital control command 34 "instructs" PL transmitter 24 how its time should be adjusted. Rather than computing a control command in reference receiver 22, the PL time error could simply be sent to the PL transmitter 24, with the transmitter 24 determining a correction from the PL time error. In this case, the applied time control should be communicated back to reference receiver 22 to allow the receiver's 22 Kalman filter to keep track of adjustments.

PL transmitter 24 further processes the control command 34 to develop a 50 Hz control signal 44 that is applied to the numerically controlled oscillator (NCO) of PL transmitter 24. The 50 Hz control signal functions to change the time (frequency) of PL transmitter 24 in a series of small steps, changing the output of the NCO through a ramp function rather than a step function. For example, if the PL transmitter 24 time differed from GPS time by 1 nanosecond, rather than changing the output of the NCO by one nanosecond in one step, the output of the NCO is changed one nanosecond over the course of 50 smaller steps. These smaller frequency changes may all be the same size (linear) or they may be different sized (nonlinear) steps. The output of the NCO could be changed in one relatively larger step rather than through a series of smaller steps and the PL transmitter 24 time would still track GPS time. However, if the output of the NCO is changed too quickly, receivers that are distant from the PL 20 will have a difficult time tracking the pseudolite signal 27 broadcast by PL transmitter 24. In one embodiment, the acceleration (change between the steps) is limited to a range 0.005–0.01 m/sec$^2$.

Figure 4:
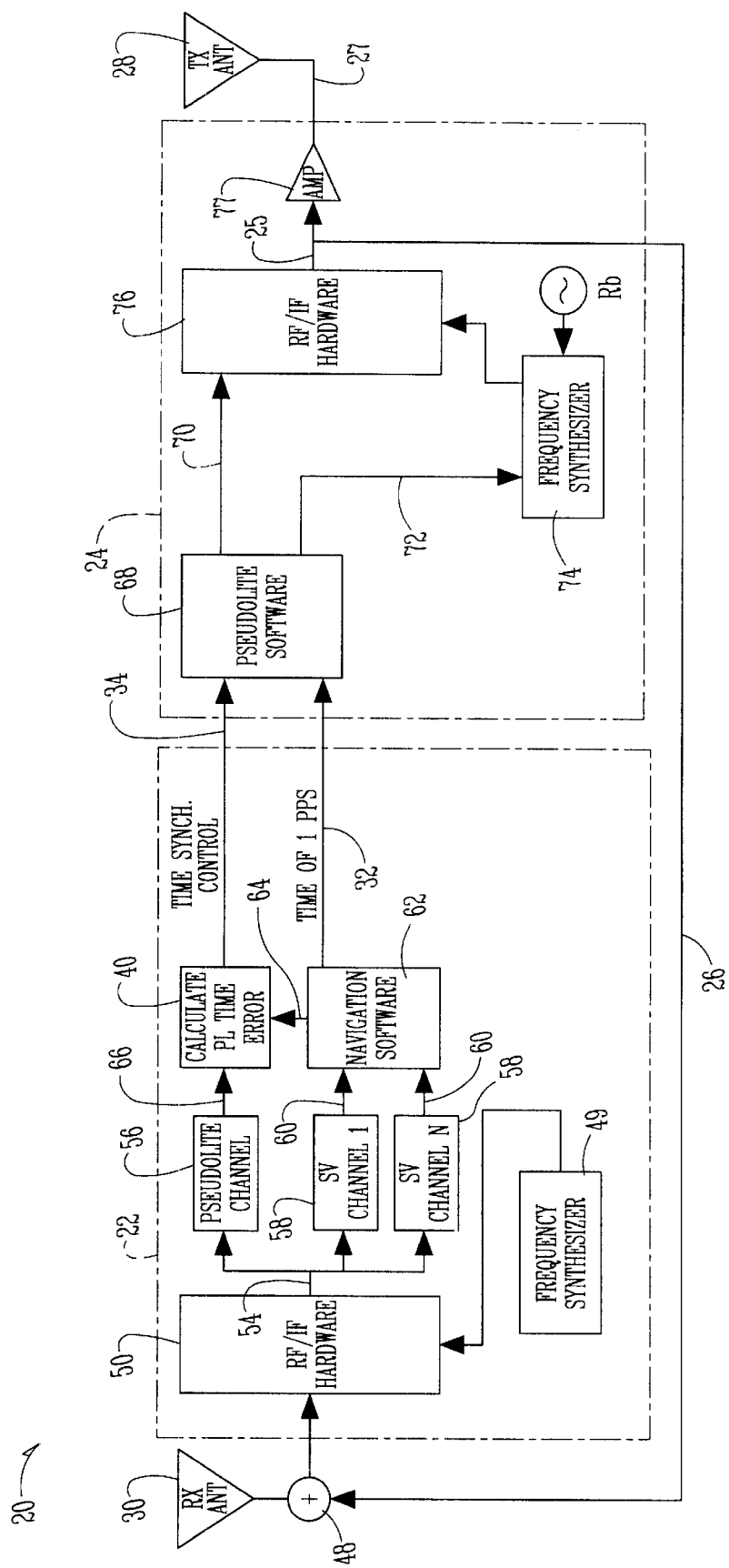
FIG. 4 is a block diagram which adds further detail to FIGS. 2 and 3.

FIG. 4 is a block diagram which adds further detail to FIGS. 2 and 3. Pseudolite signal 26 and the true GPS signals are combined in the reference receiver's 22 input combiner 48. These signals are then passed through the receiver's 22 hardware 50. The hardware 50 performs signal processing and tracking as is understood in the art. A frequency synthesizer 49 is an input into hardware 50. Hardware 50 outputs signals 54 that are fed to a pseudolite channel 56 and SV channels 58. Pseudolite channel 56 receives the pseudolite transmitter 24 time which was calculated by hardware 50 based on pseudolite pseudorange measurements. Signal 66 passes the pseudolite time to the calculate PL time error 40 block.

SV channels 58 output signals 60 to the navigation software 62. The navigation software calculates a position solution and GPS time. Signal 64 inputs GPS time to the calculate PL time error 40 block. The PL time error is calculated from the GPS time and the pseudolite time. A control command 34, which is based on the PL time error, is sent to the pseudolite software 68.

Pseudolite software 68 sends a first signal 70 to instruct the PL transmitter 24 hardware 76 to generate the appropriate pseudolite signals. Pseudolite software 68 also computes the 50 Hz time synch control and sends this control signal 72 to the frequency synthesizer (or numerically controlled oscillator) 74. The control signal incrementally adjusts the time of frequency synthesizer 74.

Frequency synthesizer 74 will have some variation in its oscillations due to factors such as temperature changes. By slaving the time of frequency synthesizer 74 to GPS time, these temperature variations can almost be eliminated. Through use of a method according to the present invention, after a first adjustment of the frequency synthesizer 74 time to match GPS time, any future offset in the pseudolite time relative to GPS time can be limited to less than 10 nanoseconds, with a possible limit of 1–2 nanoseconds. Limiting the offset greatly increases the navigational accuracy for those receivers that receive the broadcast pseudolite signal 27.

Frequency synthesizer 74 sends signals to hardware 76. Hardware 76 utilizes frequency synthesizer 74 to generate L1/L2 signals 25 through conventional methods. The L1/L2 signals 25 are sent to the amplifier 77.

Figure 5:
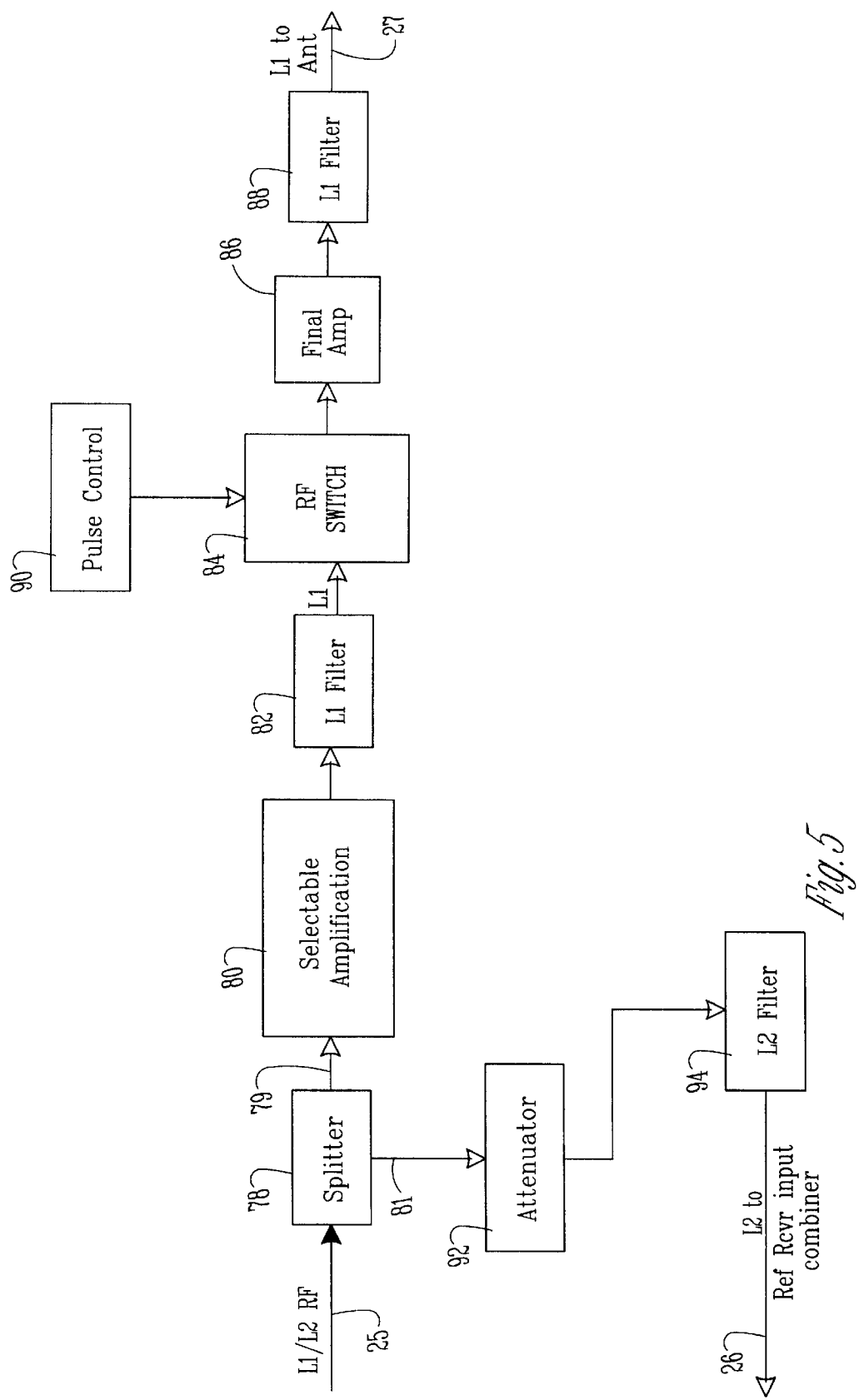
FIG. 5 is a block diagram which shows part of FIG. 4 in greater detail.

FIG. 5 is a block diagram which shows part of FIG. 4 in greater detail. The L1/L2 signals 25 are input into a splitter 78 which splits signal 25 into signals 79 and 81. Signal 79 is passed through a selectable amplification block 80. After the signal is amplified, it is passed through an L1 filter 82 to the RF switch 84. A pulse control 90 controls the RF switch 84. The pulse control 90 determines whether pulsed or continuous wave (CW) L1 is sent to the final amp 86 by either turning the switch 84 on and off (pulsing) or leaving the switch on (CW). The L1 signal is passed through the final amp 86 and through the L1 filter 88 where it is broadcast through the antenna 28.

Split signal 81 is sent to the attenuator 92. The attenuated signal is passed through L2 filter 94. After being filtered, the L2 signal 26 is sent to the reference receiver 22. As will be readily apparent to those of skill in the art, there are a number of other ways in which the L1/L2 signals could be processed and communicated to the antenna and/or receiver.

One method of initializing the PL transmitter 24 time can also be seen in FIGS. 2 and 4. The navigation software 62 determines GPS time from the SV signals. Reference receiver 22 sends a one pulse per second (PPS) signal 32 to the PL transmitter 24. The one PPS signal 32 contains a coarse estimate of GPS time. The GPS time estimate is communicated to pseudolite software 68 which initializes frequency synthesizer 74. As shown in FIG. 4, frequency synthesizer 74 is based on the rubidium frequency standard. Other frequency standards could be utilized for the frequency standard. The pseudolite transmitter 24 time, i.e., frequency synthesizer 74, is preferably not initialized until after the rubidium frequency (or other frequency standard) has stabilized. If the time is initialized before stabilization, the time error measurements will be noisy until stabilization. Of course, the time could be initialized prior to stabilization with the noise problem being resolved in a different manner.

Thus, a method and means of precise time synchronization is disclosed which possesses at least all of the stated objects. From the foregoing, it will be observed that numerous variations and modifications may be affected without departing from the spirit and scope of the novel concepts of the present invention. It will be understood that no limitation with respect to the specific embodiment illustrated herein is intended or should be inferred. The terms and expressions which have been employed herein are used as terms of description and not of limitation. There is no intent in the use of such terms and expressions to exclude any future equivalents of features shown and described herein, but it is recognized that various modifications are possible within the scope of invention now claimed.

What is claimed is:

1. A method of synchronizing a slave time with a master time, comprising:

(a) transmitting a slave time based on an internal clock;

(b) receiving the slave time;

(c) receiving a signal from a remote source from which a master time can be derived;

(d) comparing the received slave time with the master time to detect any offset of the received slave time relative to the master time; and (e) if the received slave time is offset from the master time, adjusting the internal clock to correct the offset, wherein the slave time is a pseudolite time.

2. The method of claim 1 wherein the master time is GPS time.

3. A method of synchronizing a pseudolite transmitter time with global navigational satellite system (GNSS) time, the method comprising:

(a) initializing the pseudolite transmitter time;

(b) comparing the pseudolite transmitter time with the GNSS time to monitor any offset of the pseudolite transmitter time relative to GNSS time; and (c) adjusting the pseudolite transmitter time to correct any offset.

4. The method of claim 3, further comprising: (d) recursively repeating steps (b) and (c).

5. The method of claim 3 wherein the GNSS is a global positioning system.

6. The method of claim 3 wherein the step of comparing pseudolite transmitter time and GNSS time comprises:

communicating a pseudolite signal to a GNSS receiver;

deriving the pseudolite transmitter time from pseudolite pseudorange measurements; and comparing the derived pseudolite transmitter time to GNSS time.

7. The method of claim 6 wherein adjusting the pseudolite time comprises:

generating a control signal in the receiver that is dependent on any pseudolite transmitter time offset;

communicating the control signal from the receiver to the pseudolite transmitter; and adjusting the pseudolite transmitter time based on the control signal.

8. The method of claim 7 wherein the pseudolite transmitter time is adjusted through a series of frequency control steps.

9. The method of claim 8 wherein a frequency change between the steps is less than a predetermined limit.

10. The method of claim 9 wherein the predetermined limit is set so that a receiver will be able to track a broadcast pseudolite signal as the pseudolite transmitter time is adjusted.

11. The method of claim 3 wherein initializing the pseudolite transmitter time comprises:

communicating GNSS time from the receiver to the transmitter; and setting the pseudolite transmitter time to match GNSS time.

12. The method of claim 11 wherein the pseudolite time is not initialized until a frequency standard of the pseudolite transmitter has stabilized.

13. The method of claim 6 wherein the pseudorange measurements are carrier smoothed prior to comparing the pseudolite transmitter time to GNSS time.

14. The method of claim 7, further comprising:

lowpass filtering the time error before generating the frequency control signal.

15. An improved pseudolite, comprising:

a pseudolite transmitter which transmits pseudolite signals;

a global navigational satellite system (GNSS) receiver in operative communication with the pseudolite transmitter, the receiver capable of receiving GNSS signals and a signal from which the pseudolite transmitter time can be derived, the receiver programmed to compare the pseudolite time to a GNSS time to determine a pseudolite time offset relative to GNSS time and communicate a control signal to the pseudolite transmitter to adjust the pseudolite time based on the pseudolite time offset.

16. The improved pseudolite of claim 15 wherein the GNSS is a global positioning system.

17. The improved pseudolite of claim 15 wherein the receiver receives pseudolite signals from the pseudolite transmitter and derives pseudolite transmitter time from pseudorange measurements.

18. The improved pseudolite of claim 16 wherein the receiver is programmed to recursively compare the derived pseudolite time with GNSS time and to recursively communicate a control signal that is dependent on any offset to the pseudolite transmitter.

19. The improved pseudolite of claim 15 wherein the pseudolite transmitter adjusts the pseudolite transmitter time through a series of steps.

20. The improved pseudolite of claim 19 wherein a frequency change between steps is less than a predetermined limit.

21. The improved pseudolite of claim 18 wherein the receiver is further programmed to communicate GNSS time to the pseudolite transmitter to initialize the pseudolite transmitter time.

\* \* \* \* \*